INVENTOR
DAVID E. SAWYER

BY Herbert E. Farmer

ATTORNEY

United States Patent

[11] 3,623,030

[72] Inventor David E. Sawyer
Newton Centre, Mass.
[21] Appl. No. 39,755
[22] Filed May 22, 1970
[45] Patented Nov. 23, 1971
[73] Assignee The United States of America as represented by the Administrator of the National Aeronautics and Space Administration

[54] SEMICONDUCTOR-FERROELECTRIC MEMORY DEVICE
10 Claims, 7 Drawing Figs.

[52] U.S. Cl. .......... 340/173.2, 340/173 LS, 307/299, 307/303, 307/311
[51] Int. Cl. .......... G11c 11/22, G11c 11/40, G11c 13/04, H03k 3/42
[50] Field of Search .......... 340/173 LS, 173.2; 307/299, 303, 311

[56] References Cited
UNITED STATES PATENTS

| | | | |
|---|---|---|---|
| 3,229,261 | 1/1966 | Fatuzzo | 340/173 |
| 3,528,064 | 9/1970 | Everhart | 340/173 |

*Primary Examiner*—Terrell W. Fears
*Attorneys*—Herbert E. Farmer, John R. Manning, David Robbins and Alvin J. Englert

ABSTRACT: A monolithic, optically written and electrically read ferroelectric memory element employing a single crystal of barium titanate. One portion of the crystal possesses ferroelectric capacitor properties and another portion has been reduced to convert that portion from an insulator materal to an N-type semiconductor. At least one of the capacitor electrodes is transparent and contacts the semiconductor portion to form a Schottky barrier electrode. With the memory element connected in a circuit such that the Schottky diode is reverse biased, the "write" state is achieved by light excitation of the semiconductor portion through the transparent electrode which charges the ferroelectric capacitor portion of the crystal. The device is electrically read by examining the remanent polarization state of the ferroelectric capacitor portion.

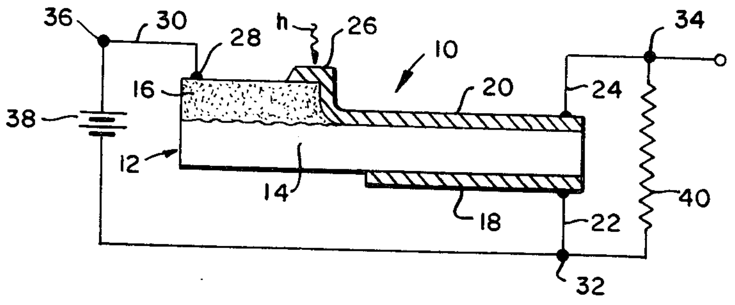

SEMICONDUCTOR-FERROELECTRIC MEMORY DEVICE

ORIGIN OF THE INVENTION

The invention described herein was made by an employee of the United States Government and may be manufactured and used by or for the government for governments purposes without the payment of any royalties thereon or therefor.

SUMMARY OF THE INVENTION

1. Field of the Invention

This invention relates to the field of memory devices and is more particularly concerned with ferroelectric memory devices in which the electrostatic hysteresis properties of a material are employed for storing information.

2. Description of the Prior Art

Ferroelectric substances have been known for many years and one of the principal uses of the substances has been in the data storage field. The electrostatic hysteresis properties of ferroelectric materials are particularly suitable for memory functions because of the inherent charge retention properties at two oppositely polarized remanent states. A pulse of appropriate polarity and sufficient amplitude drives the substance into one of its two saturated states of polarization to write a binary "1" or "0" and on removal of the writing pulse, the written information is preserved in the remanent polarization of the substance. The bistable character of the substance is ideal for data storage in digital computers.

U.S. Pat. No. 2,717,372 shows a number of memory devices which employ the ferroelectric properties of certain materials. One of the materials which is particularly suited to the memory function is barium titanate.

When employed as a ferroelectric in the memory devices, the barium titanate possesses the characteristics of an insulator with strong electrostatic hysteresis properties. More recently, another property of the barium titanate crystals has been investigated. Crystals of barium titanate grown by the Remeika technique, described in the *Journal of the American Chemical Society* vol. 76, 940 (1954), have been reduced (heated in a hydrogen atmosphere) and converted from an insulator to an N-type semiconductor material. Certain metals deposited on the semiconductor form high-barrier contacts (see T. Murakami, *Journal of Physics Society Japan* vol. 24, 282 (1968), and it is found the Schottky diodes made in this manner are photosensitive as described in an article by the inventor in "Applied Physics Letters," vol. 13, 392 (1968).

It is a principal object of the present invention to disclose a ferroelectric memory element employing both the photoelectric and the ferroelectric properties of a barium titanate crystal.

It is also an object of the present invention to disclose a memory device which employs the semiconductor and ferroelectric properties of single-crystal barium titanate.

It is still a further object of the present invention to disclose a monolithic, optically written, electrically read, ferroelectric memory element employing single-crystal barium titanate.

BRIEF DESCRIPTION OF THE DRAWINGS

The novel ferroelectric memory device and its numerous advantages described below will be better understood by reference to the following drawings in which like numerals identify like elements throughout the several figures:

FIG. 5*b* is a plot showing the modified shape of an interrogation pulse for a negative saturation state of the ferroelectric capacitor.

DESCRIPTION OF THE PREFERRED EMBODIMENTS

Figure 1:
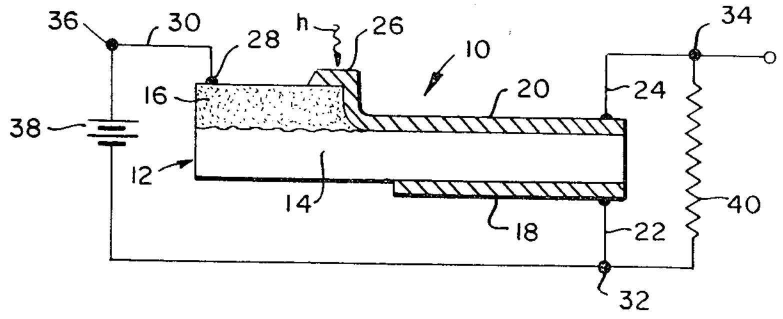
FIG. 1 shows the memory device in a reverse-biased electrical circuit and indicates the principal components of the device in cross section.

FIG. 1 shows the memory device of the present invention in cross section and connected in an electrical circuit which reverse biases the Schottky diode elements to permit the memory device to display its photoelectric characteristics. The memory device generally designated 10 is a monolithic element employing a single crystal 12 of barium titanate grown by the Remeika process.

The crystal 12 is composed of two principal portions, an insulating and ferroelectric portion 14 and a semiconductor portion 16. Two plates 18 and 20 at one end of the ferroelectric portion 14 are located on opposite surfaces of the crystal 12. The plate 18 is connected to a conductor 22. The plate 20 is connected to conductor 24 and also has a section 26 which overlaps one end of the semiconductor portion 16 of the crystal 12. Both of the plates 18 and 20 are made of a conductive material and are disposed substantially opposite one another on the ferroelectric portion 14 of the crystal 12 so that a ferroelectric capacitor structure with leads 22 and 24 is formed.

The overlapping section 26 of plate 20 is in electrical contact with the semiconducting portion 16 and also is transparent to light waves indicated by the wavy line *h*, that is, substantial numbers of photons of light energy impinging on section 26 are transmitted through the section 26 to the underlying semiconductor portion 16.

At the opposite end of the semiconductor portions 16, an ohmic contact 28 is provided for connecting conductor 30 to the crystal 12. The conductors 22, 24 and 30 lead to terminals 32, 34 and 36, respectively. These terminals are employed to connect the memory device into the external circuitry for operating the device 10. The circuitry includes a reverse-bias, DC voltage source 38 having a positive side connected to terminal 36 and a negative side connected to terminal 32. Extending between the terminals 32 and 34 is an external resistor 40 of large valve which is employed to prevent the Schottky diode dark current (current in the absence of light) from charging the ferroelectric capacitor eventually to its switching threshold.

Fabrication of the memory device 10 according to one embodiment of the invention begins with a platelet of barium titanate grown by the Remeika technique. Such a platelet may range between 0.25 mm. to 0.40 mm. in thickness. The platelet is then heated in a pure hydrogen atmosphere for approximately 90 minutes at a temperature of 710° C. The platelets are then diced and cleaned for 15 minutes in hot (150° C.) phosphoric acid. The hydrogen treatment converts the surface of the barium titanate platelet from a ferroelectric insulator to an N-type semiconductor as revealed by a thermoelectric probe. The conversion depth for the particular time-temperature combination described is approximately 33 micrometers. The diced elements are then rinsed in distilled water and air dried. As indicated in FIG. 1, a portion of the reduced surface of the diced platelet is then removed to leave the semiconductor portion 16 along at one end of the crystal 12. The electrodes or plates 18 and 20 are applied by a vapor deposition process. In one embodiment, the electrodes are formed of gold which has been evaporated from a molybdenum boat. A shutter above the boat is opened after evaporation has begun at pressures between $1\times10^{-7}$ and $3\times10^{-7}$ Torr. The deposition on the crystal 12 takes place through suitably shaped holes in a molybdenum mask in contact with the barium titanate. Deposition is terminated with a thickness of approximately 140 A. which allows photons of light energy to pass through the electrode to the semiconductor portion 16. The plated crystal is then mounted on a TO–5 transistor header using an indium-gallium alloy which also serves as an ohmic contact to the reduced semiconductor portion 16. The conductors 22, 24 and 30 are 3-mil gold wire leads connected to the plates 18 and 20 and the ohmic contact 28 by means of a spot of silver paint.

Figure 2:
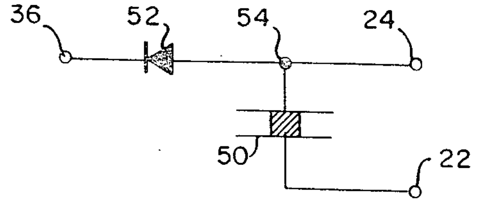
FIG. 2 is a diagram showing an equivalent electrical model of the memory device in FIG. 1.

FIG. 2 shows an equivalent electrical model of the memory device 10 in FIG. 1. The corresponding terminals 22, 24 and 36 are shown to identify the respective electrical contacts to the device 10. It will be noted that the equivalent electrical model consists of a ferroelectric capacitor 50 connected in series with a diode 52 at junction 54. A comparison of the electrical model with the actual device 10 reveals that the plates 18 and 20 with the intervening ferroelectric portion 14 form the equivalent of ferroelectric capacitor 50. The semiconductor portion 16 forms the cathode and the section 26 of plate 20 the anode of the equivalent electrical diode 52.

Figure 4A:
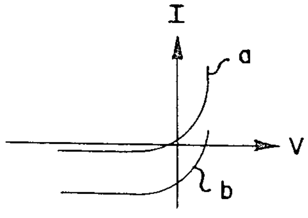
FIG. 4*a* is a plot showing the photoresponse characteristics of a barium titanate reverse-biased photodiode.

It would be well to briefly examine the individual operating characteristics of a ferroelectric capacitor and a photodiode when fabricated according to the construction in FIG. 1. FIG. 4*a* is a plot of the typical current-voltage response of a reverse-biased photodiode such as a Schottky barrier diode. The structure of the Schottky barrier diode formed at the interface of section 26 and the semiconductor portion 16 in FIG. 1 corresponds essentially to this type of diode. In operation, when the diode is reverse biased by the source 38, an electric field exists just below the surface of the semiconductor. If the top electrode is transparent, photons with energy in the vicinity of the energy band gap are absorbed and give rise to a hole-electron pair. The holes and electrons separate and move in opposite directions in the barrier field. This motion in the field region gives rise to a photovoltage for an open circuit case or a photocurrent for a closed circuit case. The mechanics of photoresponse as outlined are well known and have been applied successfully to explain the response of Schottky barrier diodes made with the more conventional semiconductor material. When the N-type semiconductor is not illuminated, the voltage-current characteristics are as indicated by the plot indicated generally by the letter *a*. Plot *a* shows well-defined diode characteristics with a forward conduction "knee" (for 0.1 ma.) at about 1.2 v., and reverse currents below 1 microamp for voltages ranging from about 2–15 v. When illuminated under a reverse bias, the diode acts as a current generator as described above and produces a response similar to that shown in the plot generally designated *b*. It is this feature of the barrier diode which is employed in the present invention to optically write the memory device 10.

Figure 4B:
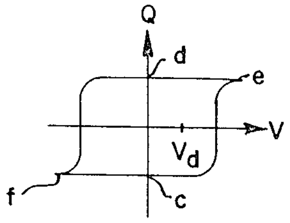
FIG. 4*b* is a plot showing the charge versus field characteristics of a barium titanate ferroelectric capacitor.

FIG. 4*b* discloses the typical charge versus field characteristics curve produced by the integrated ferroelectric capacitor formed by portion 14 and plates 18 and 20 in FIG. 1. Since the operational characteristics of such capacitors are well known and described in U.S. Pat. No. 2,717,372, referenced above, only brief comments are appropriate. The ferroelectric capacitor possesses two remanent polarization states indicated at *c* and *d*. These states are assumed when a voltage of the appropriate polarity and sufficient magnitude to saturate the capacitor is applied to and removed from the capacitor. The two states are advantageously employed in memory devices since the capacitor when so excited assumes the character of a bistable element.

Figure 3:
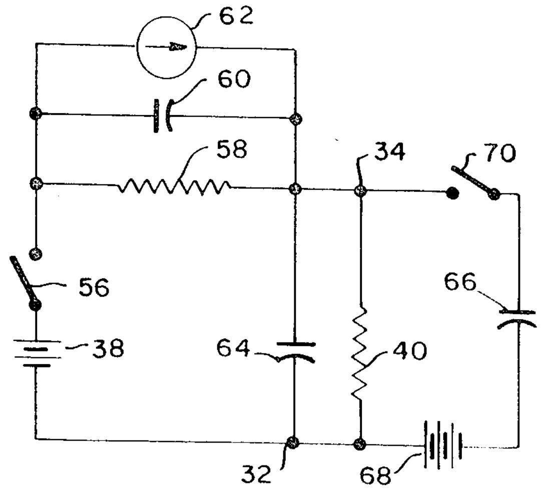
FIG. 3 is an electrical circuit suitable for reading and writing the memory device with functional elements of the memory device substituted for the physical elements.

The operation of the memory device 10 and its associated electrical circuitry may be better understood by reference to FIG. 3. The circuitry shows the distinct electrical characteristics of all components in FIG. 1. A switch 56 which was not shown in FIG. 1 is included for activating and deactivating the memory device 10. The electrical characteristics of the Schottky diode formed at the interface of portion 16 and section 26 are represented in FIG. 3 by the resistance 58, the capacitor 60 and the photoelectric current generator 62. The resistance 58 represents the diode reverse leakage characteristics, and the capacitor 60 represents the so-called diode transition region capacitance. Generator 62 represents the photoelectric current generator that would produce a current equivalent to that produced by the Schottky diode when irradiated with light *h*. The ferroelectric capacitor portion 14 of the memory device 10 is represented by capacitor 64. The resistor 40 is the same external circuit resistance 40 shown in FIG. 1.

In describing the sequence of operation of the memory device 10, it is assumed that the components of FIG. 3 obey the operating characteristics of the diode and capacitors shown in FIGS. 4*a* and 4*b*. For convenience, the initial operating state of capacitor 64 is assumed to be point *c* in FIG. 4*b*. When the switch 56 is closed, the reverse bias generated by source 38 is applied to the resistor 58 and a small voltage, $V_d$, is established across the capacitor 64 when the diode is in its dark condition in FIG. 4*a*. It will be noted that the plot *a* indicates very small reverse current which leaks through the diode resistor 58 when it is reverse biased. If the diode is now illuminated as indicated by the line *h* in FIG. 1, the photoelectric characteristics according to plot *b* in FIG. 4*a* are operative and a current from generator 62 in FIG. 3 charges the capacitor 64 so that the operating point in FIG. 4*b* moves along the hysteresis loop to point *e* which is in the saturation region. If the switch 56 is now opened, the operating point shifts along the hysteresis loop to the point *d*. It will be noted however, that had the diode not been illuminated before the switch 56 was opened, the polarization state of the capacitor 64 would be at the operating point *c*. The two states *c* and *d* may represent the storage of a binary "zero" or "one" respectively. Writing of the memory device 10 can therefore be accomplished optically be either exposing or not exposing the diode formed by the semiconductor portion 16 and section 26 in FIG. 1. If a binary "one" is to be stored, the diode is exposed to a light beam. If a binary "zero" is to be stored, the diode is not exposed to a light beam.

Figure 5A:
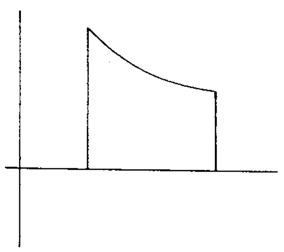
FIG. 5*a* is a plot showing the modified shape of an interrogation pulse for positive saturation state of the ferroelectric capacitor.
Figure 5A:
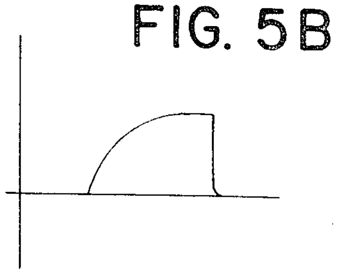

Interrogation of the memory device 10 to determine whether the remanent state of capacitor 64 is point *c* or point *d* is accomplished by momentarily closing switch 70 and applying an interrogating pulse through capacitor 66 from DC source 68 to the terminals 32 and 34. By observing the current response to the pulse across capacitor 66, the device 10 can be read. The polarity of the interrogating pulse should be negative at terminal 34 relative to terminal 32. If the capacitor is at operating point *d* in FIG. 4*b*, a pulse of such polarity and sufficient magnitude will drive the capacitor along the left-hand half of the hysteresis loop to point *f* and at the termination of the pulse the capacitor 64 will return to its initial operating point *c*. The modified appearance of the interrogating pulse across capacitor 66 when the capacitor 64 is initially at point *d* in FIG. 4*b* is shown in FIG. 5*a*. If instead, the capacitor 64 is at the memory state represented at point *c* in FIG. 4*b*, the interrogation pulse will be the shape shown in FIG. 5*b*. Detection of the leading edge of the pulse, accordingly, provides a readout of the stored information and resets the state of the ferroelectrical capacitor at operating point *c* in FIG. 4*b*.

It will be understood that I have disclosed a monolithic memory device which may be optically written and electrically read. The device is quite small and may be suitably positioned in an array formation as in a computer memory. While the memory device 10 is shown in one particular embodiment of the device, various modifications and substitutions can be made without departing from the spirit of the invention. For example, while the memory device has a generally linear construction other shapes, such as circular, or rectangular forms may be employed. In addition, where an array of such elements is desired, it is possible to fabricate as many as four or more elements on a single crystal platelet of barium titanate. It is expected that other "high work function" metals such as platinum and silver may be employed in place of gold to form the electrodes and Schottky barrier. Similarly, other "low work function" metals should operate as an ohmic contact in place of indium-gallium. The polarity of the diode can also be reversed by interchanging the ohmic contact and the transparent portion 26 of the electrode 20. In such case, the transparent portion 26 is isolated from the capacitor and forms a rectifying contact at one end of the semiconductor portion while the ohmic contact extends from the opposite end of the semiconductor portion 16 onto the insulating portion 14 to form a part of the ferroelectric capacitor. The memory device also provides an option in the manner by which it is written since in addition to the optical mode described, the more conventional electrical method of charging ferroelectric capacitors is also available. The present invention, therefore, has been described by way of illustration rather than limitation.

What is claimed is:

1. A memory device comprising:

a crystal structure, a portion of the crystal structure having insulating and ferroelectric properties and another portion having semiconductor properties;

first electrically conductive means disposed on the insulating and ferroelectric portion for forming a ferroelectric capacitor with the portion;

second electrically conductive means having a transparent section connected to the semiconductor portion of the crystal structure; and connecting means having an electrically conductive connection with the ferroelectric capacitor for joining the capacitor and the semiconductor portion of the crystal in series.

2. The memory device according to claim 1 wherein the connecting means includes the second electrically conductive means.

3. The memory device according to claim 2 wherein:

The semiconductor portion of the crystal structure is an N-type semiconductor portion having photoelectric properties.

4. The memory device according to claim 3 wherein:

the crystal structure is a barium titanate crystal.

5. The memory device according to claim 3 additionally including:

contact means electrically insulated from the first and second electrically conductive means and connected to the semiconducting portion of the crystal.

6. The memory device according to claim 5 wherein:

the contact means is an ohmic contact to the semiconductor portion.

7. The memory device according to claim 6 additionally including:

a DC voltage source connected from the contact means in a series circuit with the ferroelectric capacitor and the semiconductor portion of the crystal structure.

8. The memory device according to claim 7 wherein:

the positive side of the DC voltage source is connected to the contact means.

9. The memory device according to claim 3 wherein:

the transparent section of the second electrically conductive means is a thin coating of gold.

10. The memory device according to claim 3 wherein:

the first electrically conductive means includes two conductive capacitor plates positioned on opposite surfaces of the insulating and ferroelectric portion; and the second conductive means is a transparent electrically conductive plate section integrally connected to one of the capacitor plates of the first means.

* * * * *